E. C. GASH.
PRESERVING JAR AND THE LIKE.
APPLICATION FILED JULY 16, 1919.

1,359,351.

Patented Nov. 16, 1920.

Inventor
E. C. Gash
his Atty.

UNITED STATES PATENT OFFICE.

EDWIN CORLES GASH, OF AUCKLAND, NEW ZEALAND.

PRESERVING-JAR AND THE LIKE.

1,359,351.   Specification of Letters Patent.   Patented Nov. 16, 1920.

Application filed July 16, 1919. Serial No. 311,288.

*To all whom it may concern:*

Be it known that I, EDWIN CORLES GASH, a citizen of the Dominion of New Zealand, and residing at Nihotupu House, Via Waikumete, in the Provincial District of Auckland, New Zealand, a subject of the King of Great Britain and Ireland, have invented certain new and useful Improvements in Preserving-Jars and the like, of which the following is a specification.

This invention relates to preserving or other jars and vessels, and provides improvements whereby the lid of a jar or vessel is made airtight with the latter in a simpler and better manner than heretofore.

The invention consists in providing a circumferential channel or gutter around the neck of the jar or vessel, adapted to hold a sealing composition or matter such as wax or mutton fat.

The lid is made with a projecting rim which dips into the channel or gutter, the sealing composition being placed while in either a plastic or a liquid state into the channel or gutter to a level above the lower edge of the rim whereby air is prevented from entering the jar or vessel between the latter and the lid.

The lid may simply be placed over the neck of the jar or vessel and sealed, or before sealing can be screwed or retained by other means on the jar.

The invention will be further described with reference to the drawing in which:—

Figure 1:
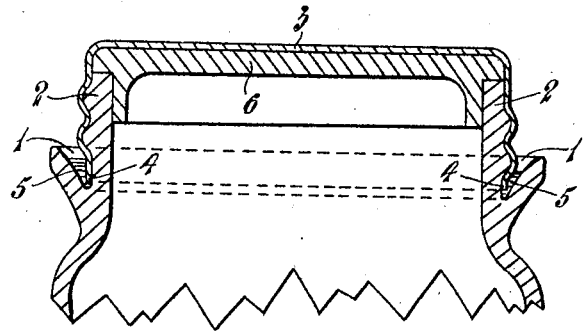
Figure 1 is a sectional elevation of portion of a jar illustrating one form of the invention.

Referring to Fig. 1 a circumferential channel or gutter 1 is provided around the neck 2 of the jar or vessel.

The lid 3 screws on the neck 2 so that the rim 4 dips into the channel or gutter 1.

After a sealing composition 5 has been filled into the channel or gutter 10 the lower edge of the rim is covered or embedded as shown and effectively seals the lid on the jar by preventing the passage of air between the latter and the rim.

The lid 3 can be made of any suitable material or metal and preferably contains a porcelain or glass top 6 fitting over the mouth of the neck.

Figure 2:
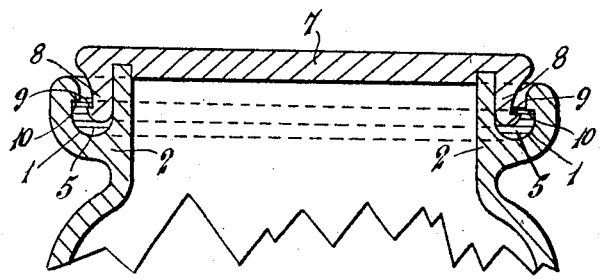
Fig. 2 is a similar view of another form.

In the form shown in Fig. 2 the lid 7 is placed on the neck 2 without screwing, and the rim 8 is formed with a lip 9 around same, and the outer side of the gutter with a shoulder 10.

The sealing composition 5 when solid is retained in the gutter 1 by the shoulder 10, while the lip 9 retains the rim 8 in the sealing composition 5.

Figure 3:
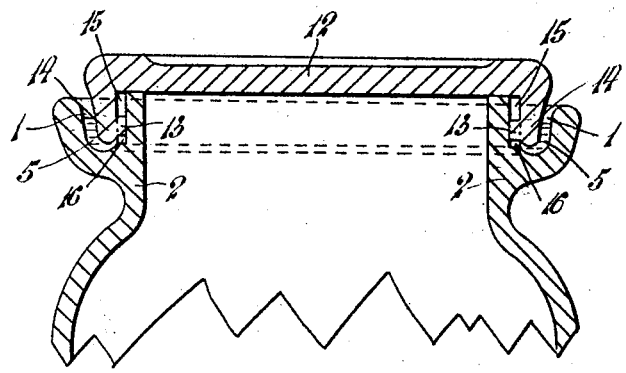
Fig. 3 is also a sectional view showing a further form.

The lid 12 shown in Fig. 3 is made of glass and is sealed in a similar manner to the lid in Figs. 1 and 2, but in placing the lid 12 on the neck 2 the projections 13 on the inside of the rim 14 are passed down the vertical grooves 15 and the lid given a partial turn to cause the projections 13 to enter horizontal grooves 16 whereby the lid is retained on the jar neck, in addition to the sealing.

The jars can be made of any suitable material such as glass, porcelain, metal or wood, and for commercial purposes the tops can be further secured on the jar by additional fastenings.

What I do claim and desire to secure by Letters Patent of the United States is:—

A jar having an opening, an annular channel formed exteriorly of the jar, the outer wall of the channel having an inwardly-projecting portion forming a shoulder interiorly of and below the top of the channel, and a cover in sealing engagement with the outside of the jar to close said jar opening and having a portion to depend within said channel, said depending portion having an outstanding projection forming a shoulder, the respective shoulders of the channel and cover being reversely positioned, the channel being adapted to receive a sealing medium to cover both shoulders and seal the junction between the cover and jar.

In testimony whereof I have signed my name to this specification in the presence of two witnesses.

EDWIN CORLES GASH.

Witnesses:
 WILLIAM BRICHES,
 D. E. RAPSON.